United States Patent [19]

Kunzfeld

[11] Patent Number: 4,480,487
[45] Date of Patent: Nov. 6, 1984

[54] DEVICE FOR TESTING THE TENSION OF A DRIVING BELT DURING OPERATION

[75] Inventor: Wilhelm Kunzfeld, Graz, Austria

[73] Assignee: AVL Gesellschaft fur Verbrennungskraftmaschinen und Messtechnick, Graz, Austria

[21] Appl. No.: 492,049

[22] Filed: May 6, 1983

[30] Foreign Application Priority Data

May 12, 1982 [AT] Austria .................. 1873/82

[51] Int. Cl.³ .............................................. G01L 5/10
[52] U.S. Cl. .................................................. 73/862.45
[58] Field of Search ........... 73/862.45, 862.42, 862.39, 73/829

[56] References Cited

U.S. PATENT DOCUMENTS

| 3,832,899 | 9/1974 | Nicolau ........................ 73/862:45 |
| 4,041,779 | 8/1977 | Greb ............................. 73/862.45 |
| 4,171,640 | 10/1979 | Van Mastrigt ............... 73/862.45 |

Primary Examiner—Anthony V. Ciarlante
Attorney, Agent, or Firm—Watson, Cole, Grindle & Watson

[57] ABSTRACT

A loading mechanism which may be moved relative to a free belt strand is provided with a measuring roller which is driven by the belt upon contact and furnished with pulse markers, and which, together with a pulse transducer sets to zero a device measuring the distance travelled by the loading mechanism, as soon as the measuring roller begins to rotate. The distance measured after a given period of contact of the loading mechanism acting with a known force is used as a measure for the belt tension.

2 Claims, 1 Drawing Figure

U.S. Patent
Nov. 6, 1984
4,480,487
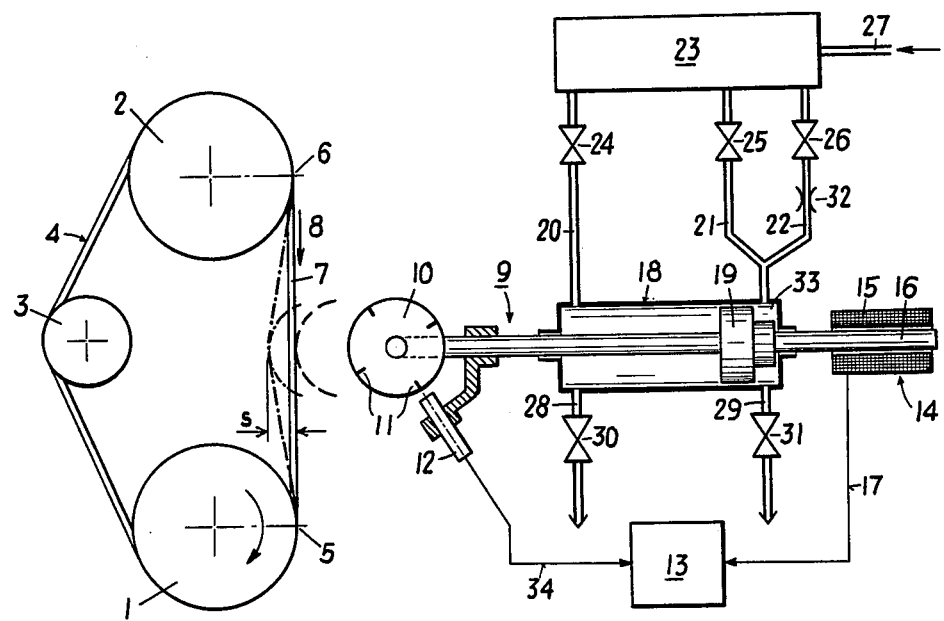

DEVICE FOR TESTING THE TENSION OF A DRIVING BELT DURING OPERATION

BACKGROUND OF THE INVENTION

The present invention relates to a device for testing the tension of a belt used for driving certain parts of an engine, e.g., of a toothed belt transmitting the rotation of a crankshaft to a camshaft of an internal combustion engine, the deflection of a free strand of the belt between two supporting points, which occurs if a known force is applied by a loading mechanism, serving as a measurement variable.

Proper adjustment of the tension of a driving belt is essential for the reliable operation of an engine comprising rotating elements which are coupled by such a belt, since both too low and too high a tension of the belt may damage the belt and the engine, and may cause functional failure of the engine. This is especially true for the tension of the toothed belt transmitting the rotation of the crankshaft to the camshaft of an internal combustion engine, which tension, if adjusted properly, will ensure the rigid coupling of the rotational movement of the crankshaft and the camshaft necessary for keeping the correct timing cycle.

DESCRIPTION OF THE PRIOR ART

Common practices such as adjusting the belt-tension by rule of thumb and checking it by pressing in a free belt side manually—the degree of resistance met indicating either too low or too high a belt tension—, are not satisfactory in view of the importance of a correct belt tension. Other known methods or devices include the use of a kind of gauge with two supports holding a free belt strand which is loaded with a known force applied, e.g., by a spring, the resulting deflection serving as a measure for the belt tension. A decisive drawback of such methods is that measurements of the belt tension may only be performed if the driving belt is not moving, which—in view of the fact that the driving belt is exposed to considerable additional forces during operation of the engine due to the transmitted torque—may lead to incorrect measurement values and, possibly, to an overload of the belt. Besides, the performance of routine checks of the belt tension for safety reasons may be desirable from time to time, in which case the engine has to be switched off if devices of the above type are used.

Another grave disadvantage of the known type of device is that the point of zero deflection required for the accurate determination of the belt tension is difficult to establish, which may lead to measurement errors.

SUMMARY OF THE INVENTION

It is an object of the present invention to avoid the above disadvantages of the known type of device, and to improve a device for testing the belt tension of the aforementioned type in such a way as to permit precise measurements of the belt tension during operation of the engine, i.e., while the driving belt is running.

According to the present invention a test during operation of the belt drive is made possible by providing the end of the loading mechanism which is adjacent to the belt strand to be loaded—the loading mechanism being held such that it may move towards the belt strand—with a measuring roller to be driven by the belt upon contact with it, and by providing the measuring roller with pulse markers which, together with a pulse transducer, will deliver pulses indicating the rotation of the roller to a measuring unit as soon as the measuring roller moving towards the belt strand for measuring purposes is in contact with the belt strand, by enabling a device measuring the distance travelled by the loading mechanism to be set to zero by means of the above measuring unit as soon as the measuring roller starts ro rotate, and by using the distance travelled after a given period of contact has elapsed, as a measurement variable. At the beginning of a test of the belt tension the measuring roller on the front end of the movable loading mechanism is moved towards the free belt strand between the supporting points at the driving pulley and the driven pulley of the belt. As soon as the rim of the measuring roller touches the moving belt, the previously motionless measuring roller starts to rotate; this movement is registered by the pulse markers and the pulse transducer practically without delay. The device measuring the distance travelled by the loading mechanism is set to zero by the pulses indicating the rotation of the measuring roller and thus the first contact with belt, thereby permitting very sensitive and accurate measurements to be taken. The resulting constant force acting upon the belt will cause a certain deflection indicated by a particular value for the distance travelled which directly corresponds to the belt tension prevailing in the belt strand to be tested.

Another embodiment of the present invention provides that the force which is acting on the loading mechanism towards the belt strand and which is causing the previously motionless measuring roller to move towards the moving belt strand, be applied via a working piston guided in a cylinder and actuated by a working medium at a given pressure, a throttle being inserted in a supply pipe in front of the pressure chamber in the cylinder up to the arrival of the pulses indicating the rotation of the measuring roller, which throttle is by-passed as soon as the distance measurement proper has set in. The loading mechanism which is thus actuated either hydraulically or pneumatically, will therefore permit the measuring roller to approach the belt strand to be tested very slowly until the measuring roller touches the belt strand, which is indicated via the pulse transducer as described above—, thereby increasing the accuracy of the zero-setting and thus of the entire measurement. As soon as contact with the belt strand to be tested has been indicated via the pulse transducer, the throttle in front of the pressure chamber in the cylinder of the loading mechanism is by-passed, which will cause the full working pressure to act on the piston of the loading mechanism.

DESCRIPTION OF THE DRAWING

Following is a more detailed description of a preferred embodiment of the present invention as illustrated by the enclosed diagram.

The left side of the drawing contains those parts of an engine furnished with the driving belt to be tested, which are essential for the description of the device. In the case of an internal combustion engine, e.g., which is not further presented in this drawing, it may be assumed that the driving pulley 1 is on the crankshaft and the driven pulley 2 is on the camshaft of the combustion engine; the unloaded strand of the belt is also provided with a tensioning roller 3 which is movable relative to the pulleys 1, 2 in a manner not shown in this drawing, and which is used for tightening the driving belt 4 to a greater or lesser extent.

The belt strand 7 which is freely suspended between the point of ascent 5 at the driving pulley 1 and the point of delivery 6 at the driven pulley 2, and which is driven by the driving pulley 1, is to be tested with respect to its tension while the combustion engine is running, i.e., while the driving belt 4 is moving in the direction of arrow 8.

For this purpose a loading mechanism 9 is provided which is held such that it may move in the direction of the belt strand 7 to be loaded, and whose front end is provided with a rotatable measuring roller 10 driven by the belt 4 upon contact with it. The measuring roller 10 is provided with pulse markers 11 which—after the measuring roller 10 approaching the belt strand 7 has made contact (the front contour of the measuring roller 10 at that time is indicated by a broken line) — together with a pulse transducer 12 mounted on the loading mechanism 9 will deliver pulses indicating the rotation of the measuring roller 10 to a measuring unit 13.

At the end of the loading mechanism 9 away from the measuring roller 10 a distance measuring device 14 is provided, in this case consisting of a coil 15 and a plunger 16 being directly coupled to the movement of the measuring roller 10. Via a line 17 the coil 15 is connected with the measuring unit 13 in which the inductance of the coil 15 varying with the position of the plunger 16 may be measured.

Via the measuring unit 13 the distance measuring device 14 may be set to zero as soon as the measuring roller 10 has started to rotate, which is indicated by the pulses of the pulse transducer 12, following which the distance travelled by the loading mechanism corresponding to the deflection s of the belt strand 7 is measured after a certain period of contact. This deflection s corresponds directly to the actual belt tension prevailing in the belt strand 7.

The force acting on the loading mechanism in the direction of the belt strand 7 to be loaded is applied via a working piston 19 guided in a cylinder 18 and actuated by a working medium at a certain pressure. For this purpose the cylinder 18 is connected with a pressure tank 23 via pipes 20, 21, 22 containing valves 24, 25, 26, the pressure tank 23 being supplied with pressurized working medium via a pipe 27 in a manner not shown in this drawing. In addition, the cylinder 18 is provided with outgoing pipes 28 and 29 in front of and behind the working piston 19, which contain valves 30, 31 and which serve for pressure compensation.

At the beginning of the measurement the valve 26 in pipe 22 is opened, upon which the working medium will flow via a throttle 32 from the pressure tank 23 into the chamber 33 behind the working piston 19. Due to the reduced flow of the medium caused by the throttle 32 the working piston 19 and, consequently, the loading mechanism 9 and the measuring roller 10 are moved slowly towards the belt strand 7. As soon as the previously motionless measuring roller 10 touches the moving belt a pulse sequence is transmitted on line 34 to the measuring unit 13 via the pulse markers 11 and the pulse transducer 12; as a consequence, the measuring unit 13 will cause to close valve 26 and cause valve 25 in pipe 21 to open. This will permit an unchecked flow of the working medium from the pressure tank 23 into the cylinder 18, until the pressure building up in the chamber 33 behind the piston 19 is in equilibrium with the reaction force exerted by the belt strand 7 deflected by a distance s.

Simultaneously with the switchover of the valves 25, 26 the distance measurement by means of the distance measuring device 14 is set to zero in the measuring unit 13 as soon as the measuring roller 10 touches the belt strand 7, which permits the distance s measured after a given period of contact presettable via the measuring unit 13, to be directly untilized as a measurement variable for the belt tension. The front contour of the measuring roller 10 at the end of distance measurement is indicated by a dash-dotted line in the drawing.

Upon opening valve 24 and closing valves 25 and 26 the loading mechanism 9 may return to its resting position; the transfer valves 30, 31 are opened or closed in accordance with the respective direction of motion of the working piston 19. For the sake of clarity the control circuitry between the above valves and the measuring unit 13, or rather a control unit (also not shown) connected with the latter are not entered in the drawing.

Within the scope of the present invention the loading mechanism 9 and its actuation mechanism as well as the distance measuring device may also consist of other known elements of course.

I claim:

1. A device for testing the tension of a driving belt of an engine during operation, comprising two supporting points between which one strand of said belt is freely suspended, a loading mechanism being held such that it can move towards said strand, and a measuring unit for determining the deflection of said belt strand freely suspended between said supporting points, which occurs if a known force is applied by said loading mechanism and serving as a measurement variable, wherein one end of said loading mechanism adjacent to said belt strand to be loaded is provided with a measuring roller to be driven by said belt upon contact with it, said measuring unit comprising a pulse transducer and a device for measuring the distance travelled by said loading mechanism, said measuring roller is provided with pulse markers which, together with said pulse transducer, will deliver pulses indicating the rotation of said measuring roller to said measuring unit as soon as said roller moving towards said belt strand for measuring purposes is in contact with said belt, and wherein said distance measuring device is set to zero by means of said measuring unit as soon as said measuring roller starts to rotate, and the distance travelled after a given period of contact has elapsed, is used as a measurement variable.

2. A device as in claim 1, said loading mechanism comprising a cylinder and a working piston guided therein and actuated by a working medium provided via a supply pipe at a given pressure, and a throttle being inserted in said supply pipe in front of a pressure chamber in said cylinder, wherein the force which is acting on said loading mechanism towards said belt strand and which is causing the previously motionless measuring roller to move towards said moving belt strand, is applied via said working piston and wherein said throttle is by-passed at the arrival of the pulses indicating the rotation of the said measuring roller.

* * * * *

UNITED STATES PATENT AND TRADEMARK OFFICE
CERTIFICATE OF CORRECTION

PATENT NO. : 4,480,487
DATED : Nov. 6, 1984
INVENTOR(S) : Wilhelm Kunzfeld

It is certified that error appears in the above-identified patent and that said Letters Patent is hereby corrected as shown below:

In the title page, assignee should read:
--Assignee: AVL GESELLSCHAFT FUR VERBRENNUNGSKRAFTMASCHINEN UND MESSTECHNIK M.B.H., Prof.Dr.Dr.h.c. Hans List, Graz, AUSTRIA--

Signed and Sealed this

Twenty-third Day of April 1985

[SEAL]

Attest:

DONALD J. QUIGG

Attesting Officer     Acting Commissioner of Patents and Trademarks